United States Patent
Badola et al.

(10) Patent No.: US 12,401,652 B2
(45) Date of Patent: Aug. 26, 2025

(54) SYSTEM AND METHODS FOR NETWORK ADDRESS BASED BLOCKING FOR MULTIPLE SUBSTRATES

(71) Applicant: Salesforce, Inc., San Francisco, CA (US)

(72) Inventors: Deepanshu Badola, San Francisco, CA (US); Julio Barton, San Francisco, CA (US); Jose Lejin P J, Bengaluru (IN); James Wilson, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 205 days.

(21) Appl. No.: 18/162,600

(22) Filed: Jan. 31, 2023

(65) Prior Publication Data

US 2024/0259380 A1    Aug. 1, 2024

(51) Int. Cl.
*H04L 9/40* (2022.01)
*G06F 16/178* (2019.01)

(52) U.S. Cl.
CPC .......... *H04L 63/102* (2013.01); *G06F 16/178* (2019.01)

(58) Field of Classification Search
CPC ... H04L 63/102; G06F 16/1734; G06F 16/122
See application file for complete search history.

(56) References Cited

U.S. PATENT DOCUMENTS

| | | | |
|---|---|---|---|
| 2017/0006053 A1* | 1/2017 | Greenberg | G06F 21/566 |
| 2018/0054458 A1* | 2/2018 | Marck | H04L 63/1458 |
| 2020/0007548 A1* | 1/2020 | Sanghavi | H04L 45/748 |
| 2022/0210124 A1* | 6/2022 | Smith | H04L 63/1425 |
| 2023/0247024 A1* | 8/2023 | Boshev | H04L 63/101 726/3 |

* cited by examiner

*Primary Examiner* — Esther B. Henderson
(74) *Attorney, Agent, or Firm* — Kwan & Olynick LLP

(57) ABSTRACT

System and method for network address based blocking for multiple substrates. The method includes receiving a block request to block one or more network addresses. The method also includes storing the one or more network addresses in a block list at a database repository. The block list includes a data structure with advanced schema. The advanced schema is configurable to allow for downstream processing of the block list across multiple substrates. The block list is used to block incoming traffic from or outgoing traffic to the one or more network addresses at accounts across the multiple substrates.

17 Claims, 8 Drawing Sheets

```
[
    {
        "ip_addr" : ["10.159.0.0/22"],
        "scope" : "global",
        "factor" : "ingress",
        "incident_name" : "purple rain",
        "case_number" : "12345678",
        "approver" : "Marc Benioff",
        "created" : "2021-01-05T14:30:01Z",
        "expiration" : "2021-01-15T14:30:01Z",
        "user_story" : "W-8001111"
    }
]
```

FIG. 4

SYSTEM AND METHODS FOR NETWORK ADDRESS BASED BLOCKING FOR MULTIPLE SUBSTRATES

FIELD OF TECHNOLOGY

This patent document relates generally to computer systems, and more specifically to network security.

BACKGROUND

"Cloud computing" services provide shared resources, applications, and information to computers and other devices upon request. In cloud computing environments, services can be provided by one or more servers accessible over the Internet or even the Intranet in case of private cloud services, rather than installing software locally on in-house computer systems. Users can interact with cloud computing services to undertake a wide range of tasks.

Often times, with cloud computing, users interact and communicate with backend servers via a user interface that utilizes functions defined in an Application Programming Interface (API). In many instances, underlying the API is a network of user devices and backend servers implemented on multiple different substrates. However, because each substrate utilizes its own protocols, services, and functions, blocking an external network address across multiple different substrates, in the case of an attack, is unfeasible using current technology. Thus, there is a need for a one stop tool that allows for the capability of blocking external network addresses across multiple different substrates in most optimal and fast way.

BRIEF DESCRIPTION OF THE DRAWINGS

The included drawings are for illustrative purposes and serve only to provide examples of possible structures and operations for the disclosed inventive systems, apparatus, methods and computer program products for network address based blocking across multiple substrates. These drawings in no way limit any changes in form and detail that may be made by one skilled in the art without departing from the spirit and scope of the disclosed implementations.

FIG. 4 illustrates an example data structure with advanced schema, in accordance with one or more embodiments.

DETAILED DESCRIPTION

Figure 1:
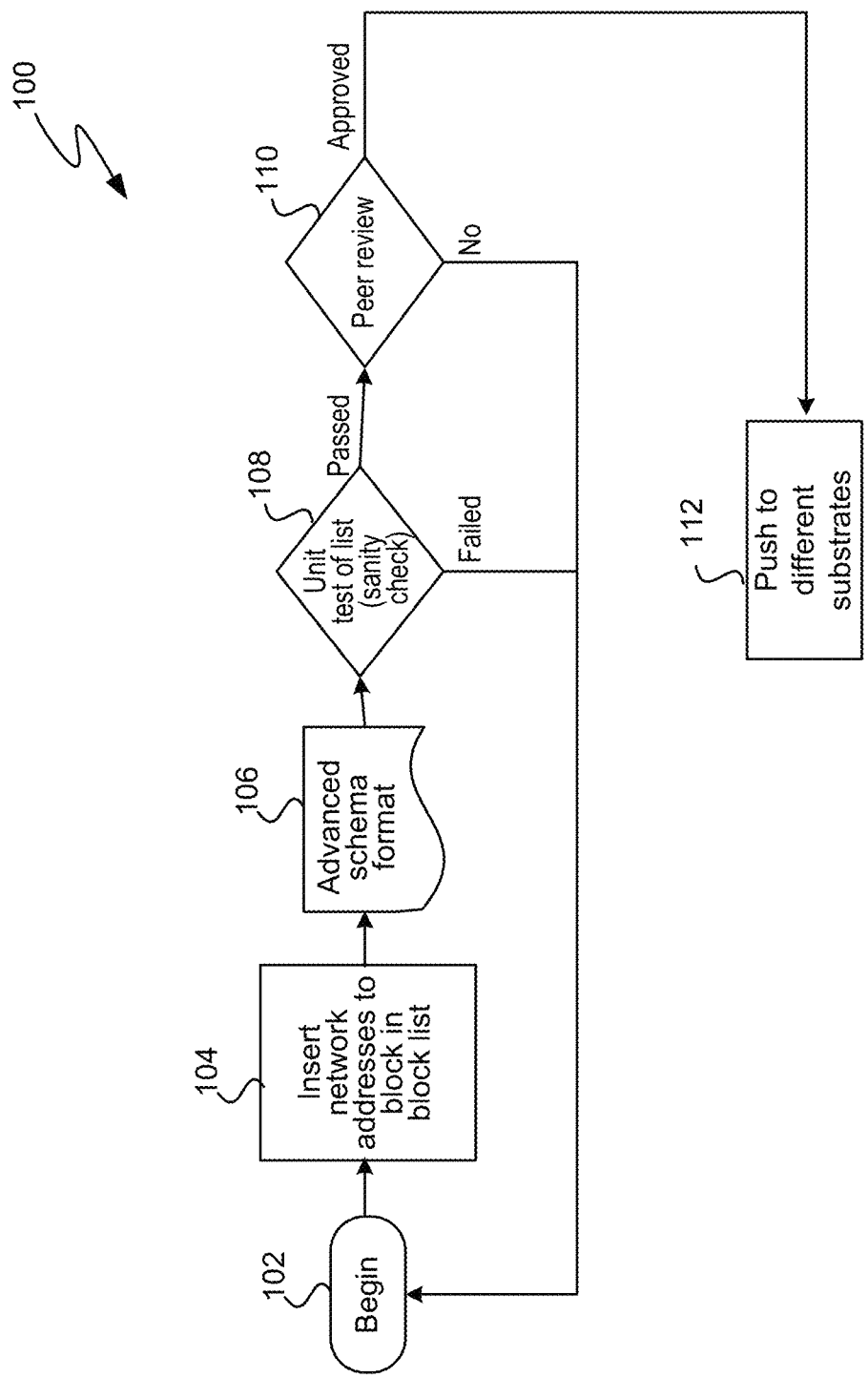
FIG. 1 depicts one example of handling an incident, in accordance with one or more embodiments.

In the following description, numerous specific details are set forth in order to provide a thorough understanding of the present disclosure. The present disclosure may be practiced without some or all of these specific details. In other instances, well known process operations have not been described in detail to not unnecessarily obscure the present disclosure. While the disclosure will be described in conjunction with the specific embodiments, it will be understood that it is not intended to limit the disclosure to the embodiments.

As mentioned above, in a networking system involving multiple substrates, there may be certain scenarios where certain network addresses, e.g., IP addresses, will need to be blocked, such as the case of IP attacks. As used herein, a "substrate" is an underlying infrastructure, such as a cloud infrastructure or a physical datacenter. For example, a substrate can be an underlying infrastructure, such as a public cloud infrastructure like AWS/GCP/Azure/AliCloud, etc., or a substrate can be a physical datacenter infrastructure completely managed by an organization. According to various embodiments, a substrate comprises a data center, network, storage, rack provisioning, architecture, and hardware engineering disciplines, which together form the base layer for all products for operation and innovation in an organization. In infrastructures that include multiple substrates, such as physical data centers and public cloud solutions, network addresses are blocked using different protocols, depending on the substrate. For example, the protocol to block a network address in a physical data center is different than the protocol for blocking network addresses in a public cloud solution. Traditionally, blocking network addresses for different substrates requires manually blocking network addresses according to each substrate's protocols. However, since attacks can happen at any time, and to any account on any substrate, manual blocking of network addresses is not practical. In addition, manual blocking takes time and is not scalable. During attack scenarios, it is important to execute network address blocking in a limited time period and in a quick, efficient way. Thus, a "single pane of glass" solution is desirable.

According to various embodiments, a single pane of glass solution should be able to block network addresses as soon as possible, independent of the type of substrate. In addition, the solution should also be able to handle near instantaneous blocking across all accounts, no matter how many accounts. In other words, the solution should automatically scale with the addition of new accounts. Thus, an ideal solution will be able to process the blocking solution in O(1), and should be independent of the number of accounts that need to be deploy the blocking. In practice, the single pane of glass solution is only limited by the blocking limits defined by each substrate.

According to various embodiments, the system utilizes a data structure, e.g., a JSON data structure, but with an advanced schema capable of specifying what network addresses need to be blocked and where the addresses need to be blocked. In some embodiments, network addresses are stored in a version controlled solution, such as a block list in a data repository. In some embodiments, the block request is validated before being processed. This ensures that multiple checkpoints are passed before processing, such as whether the requester is allowed to request a block across different substrates, or only allowed on specific substrates, or only allowed on specific accounts in a specific substrate etc., the block request itself is a valid request (e.g., no repeats), or if addresses are valid. According to various embodiments, once the request is validated, the block list gets pushed to the different substrates, which then handle the deployment.

FIG. 1 depicts one example of handling an incident, in accordance with one or more embodiments. FIG. 1 shows incident workflow 100. At 102, a requestor, e.g., an incident handler, wants to block certain network addresses. At 104, the requestor inserts the network addresses into the block list. In some embodiments, the block list is saved in a data repository as a JSON document (106).

At 108, in some embodiments, some unit tests are performed on the block list. In such embodiments, the unit tests act as a sanity check for the block request. If the unit tests fail, then the system asks the requestor to begin again (102) and modify the input, such as the network addresses in the block list. In some embodiments, the unit tests include checking whether the network addresses are allowed to be blocked. One reason for this test is to ensure that the requestor is not trying to block all or unwanted IP addresses, for example. In some embodiments, another test is whether the requestor actually has the authority to make the block request. It would not be prudent for a system to allow any user, except a qualified incident handler, to make block requests. In some embodiments, another test is whether the accounts that are targeted for blocking are actually part of the infrastructure. For example, if the request targets an account for blocking that is not actually part of the infrastructure (i.e., owned by a different entity), the request should fail.

In some embodiments, after passing the unit checks, an incident manager reviews and approves the block list (110). In such embodiments, this provides yet another level of oversight to ensure that the request is validated. Then, at 112, the approved block list gets pushed to the different substrates. How the approved block list gets processed by each substrate is described in further detail below with reference to FIG. 2.

Figure 2:
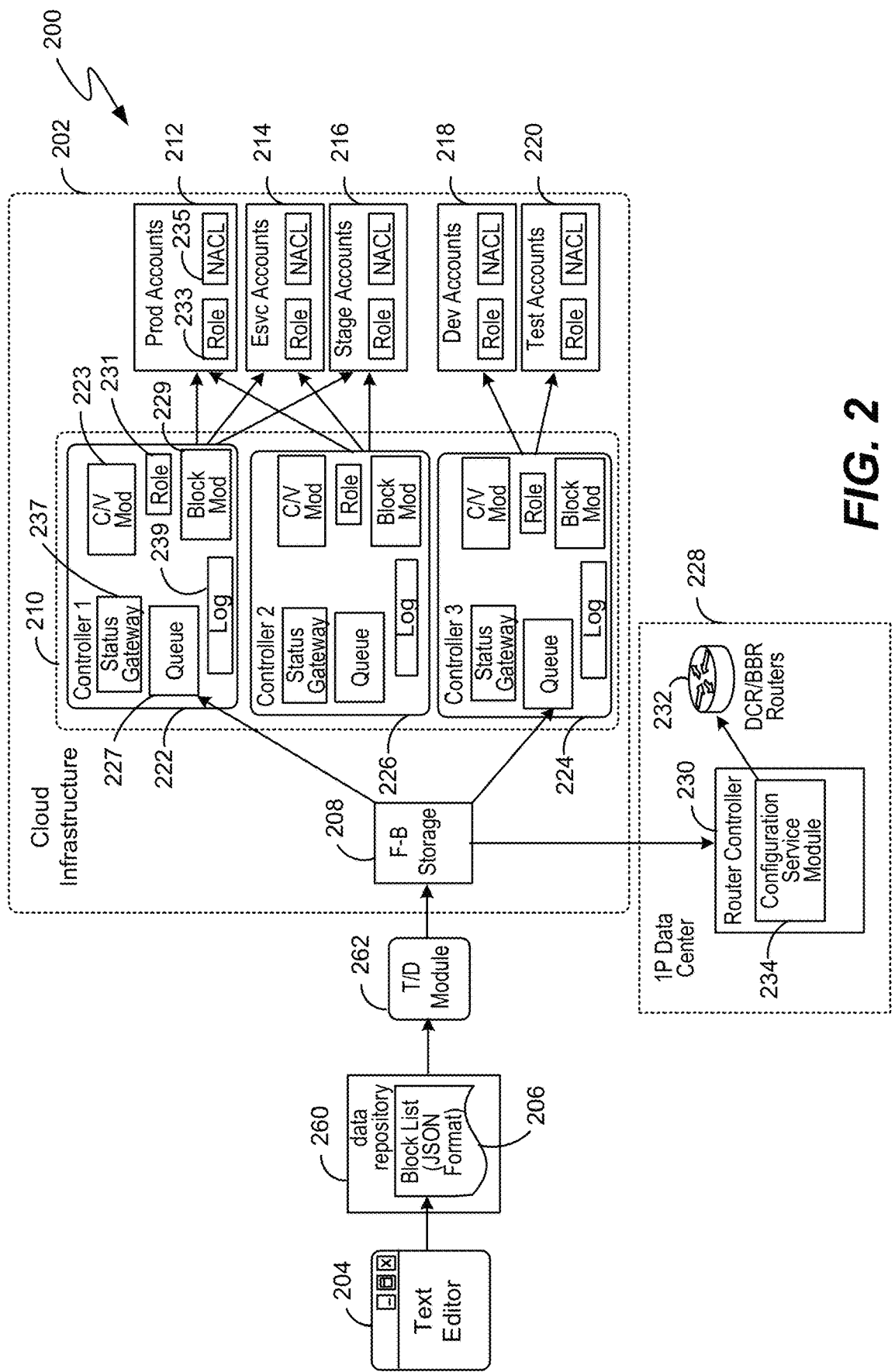
FIG. 2 is a block diagram showing how an example architecture for blocking network addresses across multiple substrates, in accordance with one or more embodiments.

FIG. 2 is a block diagram showing how an example architecture for blocking network addresses across multiple substrates, in accordance with one or more embodiments. Example architecture 200 illustrates two different examples of substrates. Substrate 202 is a cloud infrastructure substrate. Substrate 228 is a physical data center called a 1P data center. In some embodiments, architecture 200 can have multiple different kinds of substrates 202 and 228, as well as other kinds of substrates.

Similar to the process described above with reference to FIG. 1, a user utilizes a text editor 204 to make a block request. In some embodiments, text editor 204 can be part of a graphical user interface (GUI) or user interface (UI). As mentioned above, a user can be an admin user, such as an incident handler. The block request includes a block list 206 stored in a data repository 260. In some embodiments, block list 206 includes one or more network addresses, such as IP addresses. In some embodiments, data repository 260 can be any storage mechanism. However, with most storage mechanisms, in order for the data to be secure, the data cannot be accessed from multiple substrates due to security reasons. Thus, in some embodiments, the data needs to be moved to a place that can be accessible by multiple different substrates. In some embodiments, block list 206 is version controlled, such that changes to the block list can be easily identified and history can be tracked.

According to various embodiments, block list 206 is next moved by artifact transfer/distribution module (T/D module) 262 to file-based storage 208. Although network addresses in block list 206 is stored as data structures, e.g., in JSON format, with advanced schema, the list itself is still just a file. Thus, T/D module 262 must convert the file into a format that is digestible by multiple substrates and then subsequently stored. In some embodiments, T/D module 262 operates by cleaning up the file, testing the file, and then validating the file. In some embodiments, after validation, T/D module 262 also securely transfers the file and compresses the file before sending it to file-based storage 208. In some embodiments, T/D module 262 also adds an integration check by sending a signed artifact along with the compressed file to ensure the file has not been tampered.

In some embodiments, file-based storage 208 is accessible by different substrates. In some embodiments, although accessible to different substrates, access is restricted to only the substrates themselves, i.e., individual accounts on the substrates cannot access file-based storage 208 for security reasons. As previously mentioned, file-based storage 208 stores the cleaned up, validated block list 206, along with the signed artifact. The substrates then look for the file in file-based storage 208, along with the signed file, and if the substrates find the signed file, then the substrates know that the file has been validated and will pull the file. In some embodiments, the substrates are configured to look for file between intervals as a cron job. For example, the substrates will look for the file every minute or two minutes. In some embodiments, the intervals are user defined.

According to various embodiments, after the file moves to file-based storage 208 each substrate can then pull it. In some embodiments, each substrate includes a set of controllers 210, or 230. In some embodiments, the set of controllers 210 includes multiple instances of controllers, such as controller instances 222, 224, and 226. In some embodiments, the set of controllers 210 includes only one instance of a controller, similar to controller 230. According to various embodiments, because the blocking mechanism is agnostic to the substrate, all controllers in each substrate essentially include the same blocking logic.

According to various embodiments, a substrate controller 222, 224, or 226 includes a conversion and validation module 223. In some embodiments, conversion and validation module 223 is the brain of the solution because it knows when to trigger the blocking and it can also read the advanced schema, which contains field values corresponding to the block request specifics. In some embodiments, conversion and validation module 223 is responsible for looking for a new artifact, e.g., a new version of the block list, and checking if the artifact has the content/changes related to its specific substrate service by uncompressing and validating the block list. If the artifact has changes related to its specific substrate service, then conversion and validation module 223 reads the schema, gets the payload of the artifact, and validates the signed artifact to ensure no tampering. In some embodiments, if the artifact has been tampered with, the artifact will be ignored and an admin will be notified. If the artifact has not been tampered with, then conversion and validation module 223 either executes the contents of the file (if no previously executed file), or generates a diff between what was previously executed in the file and what are the new changes. Then, in some embodiments, conversion and validation module 223 generate the contents/changes, converts the contents/changes into a substrate specific format, and pushes the content/changes to a queue 227 for further processing.

According to various embodiments, queue 227 provides a safe mechanism for storing a block message in case modules downstream are down or incapable of carrying out the blocking for whatever reason. For example, if blocking module 229 is down, queue 227 will wait until blocking module 229 is available and then send the block message. If blocking module 229 fails, queue 227 will try again for a predefined number of times. In some embodiments, the predefined number of times is configurable by a user.

According to various embodiments, blocking module 229 is responsible for deploying the actual blocking function across accounts for a particular substrate. In some embodiments, in order to implement a block for a particular account, blocking module 229 assumes the permission to access the account, as defined in a role 231, and then subsequently assumes the permission to block in the account, as defined in role 233. Assumes the account and then blocks. It gets permission to access the accounts, and once it does, sets up blocking via network access control list (NACL) 235. After blocking is set up, account 212, 214, 216, 218, or 220 can no longer receive or send traffic from the network address specified in the block list. In some embodiments, blocking module 229 comprises its own CPU and memory.

According to various embodiments, in order to achieve O(1) processing time for universal blocking, multiple levels of parallelism needs to be introduced into the blocking architecture. The first level of parallelism occurs at the distribution of the block list file to multiple substrates from file-based storage 208. The second level of parallelism occurs via segregation of different accounts into different "types" of accounts, e.g., product accounts and developer accounts. The parallelism is realized by including multiple different controller instances 222 and 224, each controller instance being responsible for blocking accounts of a certain type. For example, during global blocking, both controller instances 222 and 224, will execute blocking in parallel.

In some embodiments, important or critical accounts, such as product accounts 212, e-service accounts 214, and stage accounts 216, require assurance that blocking controller instances will not fail. Thus, for special accounts, controller instance 226 acts as a backup, in case controller instance 222 fails. In some embodiments, backup controller instances need not exist for non-critical accounts, such as developer accounts 218 or test accounts 220. Thus, as an example, controller instance 224 does not have a backup controller instance in the case of failure. In some embodiments, data does not go into backup controller instance 226 unless controller instance 222 is down, in order to prevent redundancy.

According to various embodiments, a third level of parallelism occurs via hierarchical grouping of accounts. In order to handle automatic scaling of the blocking solution as more accounts are added, accounts are categorized into different hierarchies or zones. For example, multiple different accounts constitute a domain group. In addition, multiple domain groups constitute an instance group. In some embodiments, the blocking architecture is designed such that a single blocking module instance is instantiated for each instance group of accounts. Thus, in some embodiments, conversion and validation module 223 issues multiple blocking messages to queue 227, each blocking message targeted for a specific instance group. According to various embodiments, each block message sent to queue 227 triggers an instance of blocking module 229. In some embodiments, conversion and validation module 223 looks for the hierarchy information in the customer accounts themselves. In such embodiments, whenever conversion and validation module 223 runs, it pulls the latest account details for all the accounts for which its corresponding controller instance is responsible. In some embodiments, the account information is retrieved from a separate storage location. In such embodiments, every time the controller runs, it pulls the new info from that separate storage location. In some embodiments, as accounts are being added, the controller auto segregates and self-replicates to account for the new accounts.

In addition, in some embodiments, each instance of the blocking module executes multiple threads, with each thread responsible for blocking for a single account, in order to execute parallel blocking across a multitude of accounts. Thus, for example, if a substrate has two instance groups, and each instance group has 10 domain groups, and each domain group has 2 accounts, then conversion and validation module 223 will send two messages to queue 227, which will in turn trigger two instances of blocking module 229. Each blocking module instance 229 will execute 20 threads in parallel, because each instance group has 20 accounts associated with it.

According to various embodiments, status gateway 237 is responsible for checking the status of the blocking process. In some embodiments, after the blocking process has run, the user would not know if the block request has succeeded. In such embodiments, status gateway 237 can pull the information to verify if the changes went through. In some embodiments, status gateway 237 provides an endpoint to fetch information regarding all of the accounts and what is being blocked. In some embodiments, status gateway 237 uses the same conversion and validation module 223 and blocking module 229 to get the status update from the accounts. The difference being that status gateway 237 uses a different role 231, e.g., status instead of blocking, to retrieve the status information. In some embodiments, if status gateway 237 detects a fail after triggering the modules, status gateway 237 has a fail detection and recovery mechanism to retrigger the changes.

According to various embodiments, a controller 222 also includes an activity log 239 in order for a user to retroactively monitor blocking failures. In some embodiments, activity log 239 is recorded in a proper, well-structured format, such that a user can easily read and understand the log. In some embodiments, activity log 239 includes a push function to a user device.

According to various embodiments, the blocking logic for substrate 202 is the same as the blocking logic for substrate 228. While the substrate is different, e.g., substrate 228 is a 1P data center, the functions in configuration service 234 of router controller 230 is the same as the functions in controller instance 222. In some embodiments, router controller 230 pulls the file from file-based storage 208 and makes changes to a particular account or accounts. Although the blocking logic is the same, since substrate 228 is a 1P data center, all functions in the modules described above with reference to substrate 202 are performed by configuration service module 234. This is because the module segregation in substrate 202 is due to the distributive nature of the cloud infrastructure. In some embodiments, substrate 228 includes one or more routers 232, which represent accounts in different devices of the data center.

According to various embodiments, the main and backup controllers issue a "heartbeat" signal to the accounts during the blocking process. In some embodiments, if the main and backup controllers go down, the accounts are configured to self-block and not allow any traffic to the accounts from the network addresses, or from the accounts to the network addresses. In some embodiments, every account in a substrate has a lightweight agent inserted in between the controllers and the accounts. In such embodiments, if the agent does not hear the "heartbeat" from the controllers (main or backup), then the agent will self-block. In some embodiments, injection of the agent happens in peace time. In some embodiments, when self-blocking, everything inside is blocked. In some embodiments, when any account is instantiated, the provisioning logic will auto-inject the agent. In other words, in such embodiments, any account getting ready to serve in the substrate will have an agent injected by default. As used herein, an "agent" is a lightweight logic/algorithm given by the solution to an account provisioning stage, thereby injecting the agent into the account which is getting activated/created.

Figure 3:
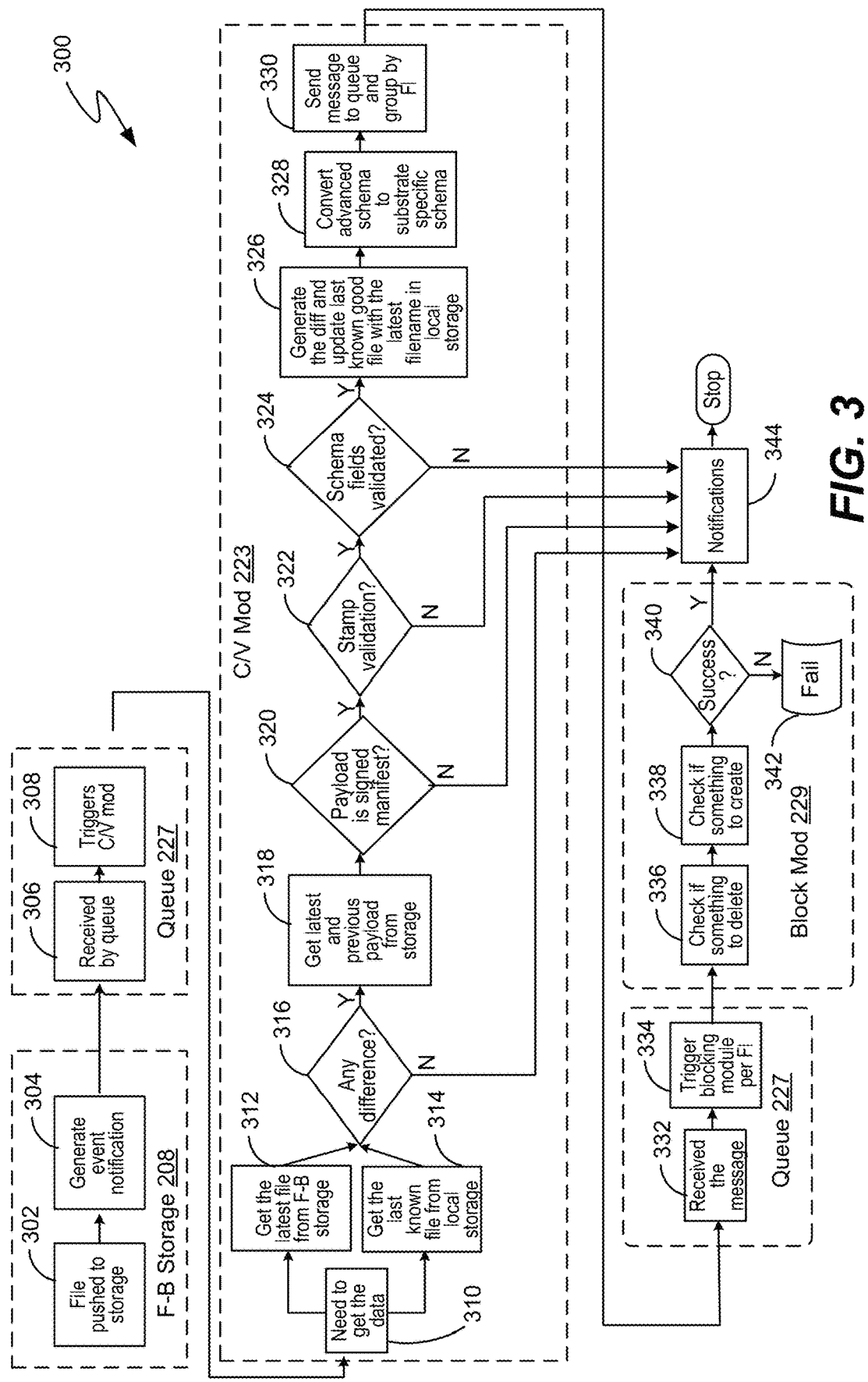
FIG. 3 illustrates an example workflow for a network substrate, in accordance with one or more embodiments.

While FIG. 2 describes the overall architecture for blocking network addresses across multiple substrates, FIG. 3 gives a more detailed example workflow of network address blocking in a substrate, in accordance with one or more embodiments. Workflow 300 begins with pushing (302) the block list file to F-B storage 208. At 304, an event notification is generated. At 306, queue 227 receives the notification event. At 308, after queue 227 receives the notification event, it triggers the conversion and validation module 223. At 310, conversion and validation module 223 retrieves the data. In some embodiments, conversion and validation module 223 is limited to a maximum of one concurrency. In such embodiments, if there are multiple changes, the changes will be handled sequentially. At 312, conversion and validation module 223 retrieves the latest file path from F-B storage 208. In addition, at 314, conversion and validation module 223 also retrieves the name of the last successfully applied file, which is stored in a security team specific local storage. At 316, conversion and validation module 223 compares the retrieved file names. If there is no difference, the function will stop and a notification will be sent out at 344. If there is a difference between the two file names, the function will download both files (318). Next, at 320, the function will check to see if the file is a signed manifest. If so, then the function will validate the latest manifest signature (322).

At 324, upon successful validation, the function will pull the latest manifest and will perform validation on the substrate related fields in the advanced schema. Once the validation has passed, the function will pull previous the version of the manifest, convert the content of the latest manifest from the advanced schema to a substrate specific schema (328), and generate the diff between the previous manifest and the latest manifest (326). At 330, the generated diff will be formatted per account zone, e.g., per FI, and will be pushed to queue 227 with group-id enabled. At 332, queue 227 receives the messages in a first-in-first-out protocol in order to ensure that all messages are processed sequentially. At 334, queue 227 triggers blocking module 229 per group-id (instance group), which will ensure a "fan out" concurrency, where changes to each instance group can occur concurrently and independently (in parallel). Once blocking module 229 is triggered, the function will pull messages sequentially from queue 227. After pulling the message, blocking module 229 determines, based on the message pulled, whether to delete a Network Access Control List (NACL) (336) or to create a NACL (338). In some embodiments, in the case where both create and delete operations are required, the delete operations will be applied before the create operations. If the blocking operations were a success (340), then notifications are sent out (344) and the process stops. If not, then the operation fails (342) and notifications are sent out.

In some embodiments, the functions compare the current file to the last known file to find the differences. In such embodiments, the functions will just use the differences and will not re-trigger all the information in the files. In such embodiments, if there is no difference, then the functions will just exit. In some embodiments, during the validation stages, if the checks fail, then the functions will not continue.

FIG. 3 illustrated just one example of a workflow for blocking network addresses in a cloud infrastructure. According to various embodiments, systems can use any subset or combination of the steps presented in FIG. 3 to accomplish blocking of network addresses in a cloud infrastructure. According to various embodiments, blocking can be outward and inward. In some embodiments, an administrator specifies the blocking to be inward or outward, or both, by filling in certain fields in the data structure's advanced schema. One example of a data structure with advanced schema is illustrated in FIG. 4.

According to various embodiments, a user inputs data into a text editor that specifies what needs to be blocked. According to various embodiments, the input is then saved in a data structure with advanced schema, as shown in the example data structure illustrated in FIG. 4. Data structure 400 includes an IP address field 402, a scope (substrate/global) field 404, and a factor (inbound or outbound/ingress or egress) field 406. In some embodiments, data structure 400 also includes other fields for internal use, such as the expiration field.

In the example illustrated in FIG. 4, the IP address field value "10.159.0.0/22" is a network address that the user wants to block. The scope field value "global" indicates that the blocking should be done across all substrates. The factor field value "ingress" indicates that all inbound traffic from "10.159.0.0/22" should be blocked.

In some embodiments, blocking can be performed on multiple accounts or a single account. In some embodiments, a user can add custom policies, e.g., block only in certain subsets or globally, using the advanced schema. According to various embodiments, a system capable of blocking across multiple substrates has many advantages. For example, in some embodiments, a user uses just one schema, but that one schema can take care of multiple substrates. Since the logic is substrate agnostic, new substrates can be added easily and the system will still work by scaling to newly added substrates. One reason for this is because the block list input uses a shared schema that is distributed from a common place. Thus, if a new multi-substrate system needs to be onboarded, the new substrate system can just pull block list from the common place. In some embodiments, this allows for a single pane of glass view for multiple substrates. In addition, the system provides for custom way of handling of blocking, as opposed to current systems that simply employ blind blocking.

Current systems mainly focus on their own devices. The techniques and mechanisms of the present disclosure are agnostic, and do not rely on specific vendor or deployment methodology. This allows for easy auto-scaling. In addition, as the solution scales, points of failure also increase. Therefore, the techniques and mechanisms of the present disclosure also include a self-blocking mechanism to deal with blocking when a failure event occurs.

Figure 5:
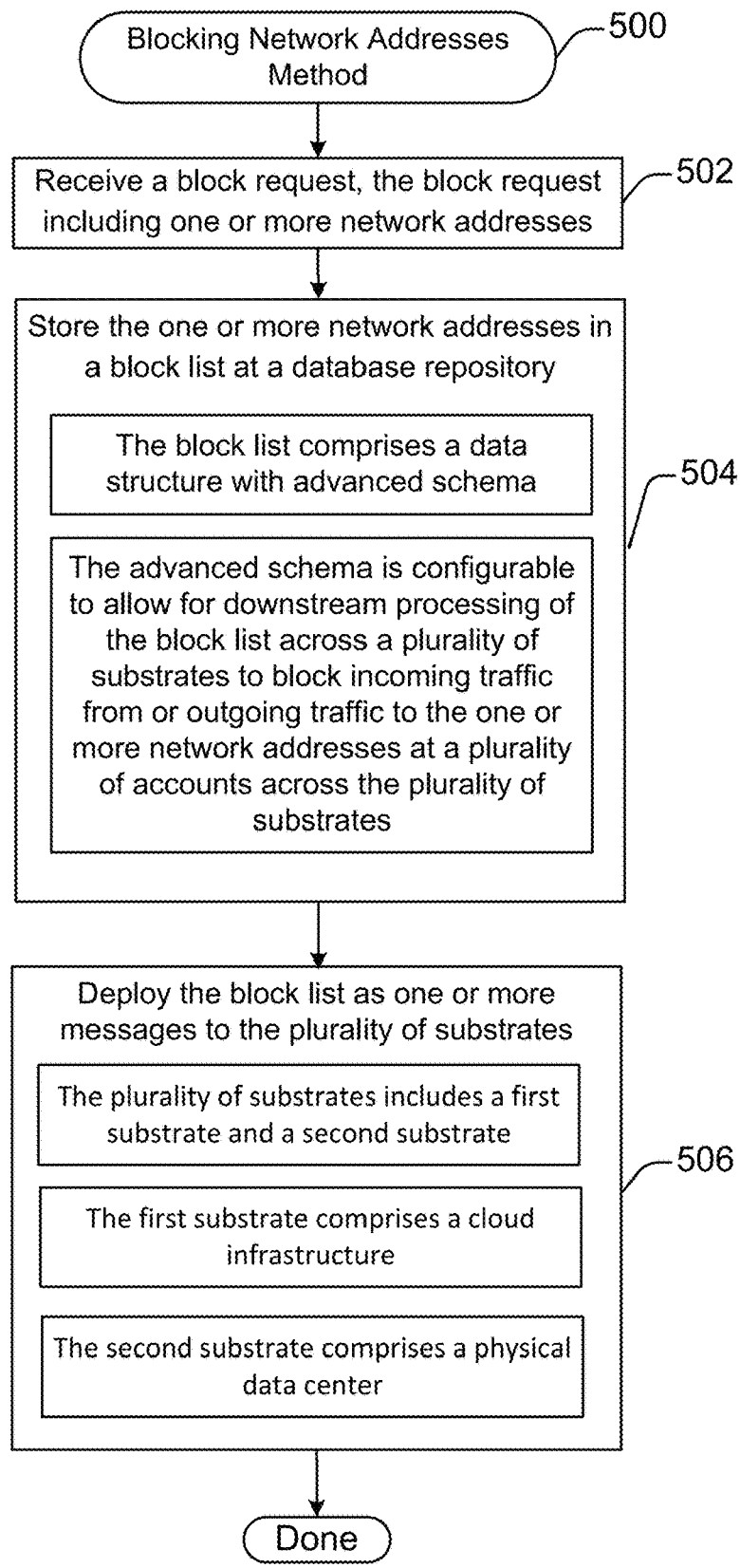
FIG. 5 illustrates an example of a method for blocking network addresses, performed in accordance with one or more embodiments.

FIG. 5 illustrates an example of a method 500 for blocking network addresses, performed in accordance with one or more embodiments. At step 502, a block request is received. In some embodiments, the block request includes one or more network addresses. At 504, one or more network addresses is stored in a block list at a database repository. In some embodiments, the block list comprises a data structure with advanced schema. In some embodiments, the advanced schema is configurable to allow for downstream processing of the block list across a plurality of substrates to block incoming traffic from or outgoing traffic to the one or more network addresses at a plurality of accounts across the plurality of substrates. Last, at 506, the block list is deployed as one or more messages to the plurality of substrates. In some embodiments, the plurality of substrates includes a first substrate and a second substrate. In some embodiments, the first substrate comprises a cloud infrastructure. In some embodiments, the second substrate comprises a physical data center.

In some embodiments, the advanced schema is further configurable to specify inward or outward blocking, as well as global or localized blocking. In some embodiments, each substrate in the plurality of substrates includes a substrate specific controller to deploy blocking to accounts in the substrate. In some embodiments, each substrate specific controller auto-segregates accounts into multiple zones and self-replicates to handle new accounts that are added to the corresponding substrate. In some embodiments, each substrate specific controller is configurable to instantiate a blocking module instance for each message in the one or more messages. In some embodiments, each blocking module instance is configurable to execute parallel threads corresponding to a subset of the plurality of accounts. In some embodiments, each account of the plurality of accounts is injected with an agent, the agent being configurable to self-block the account from the one or more network addresses if a heartbeat signal is not detected from the corresponding substrate specific controller.

Figure 6:
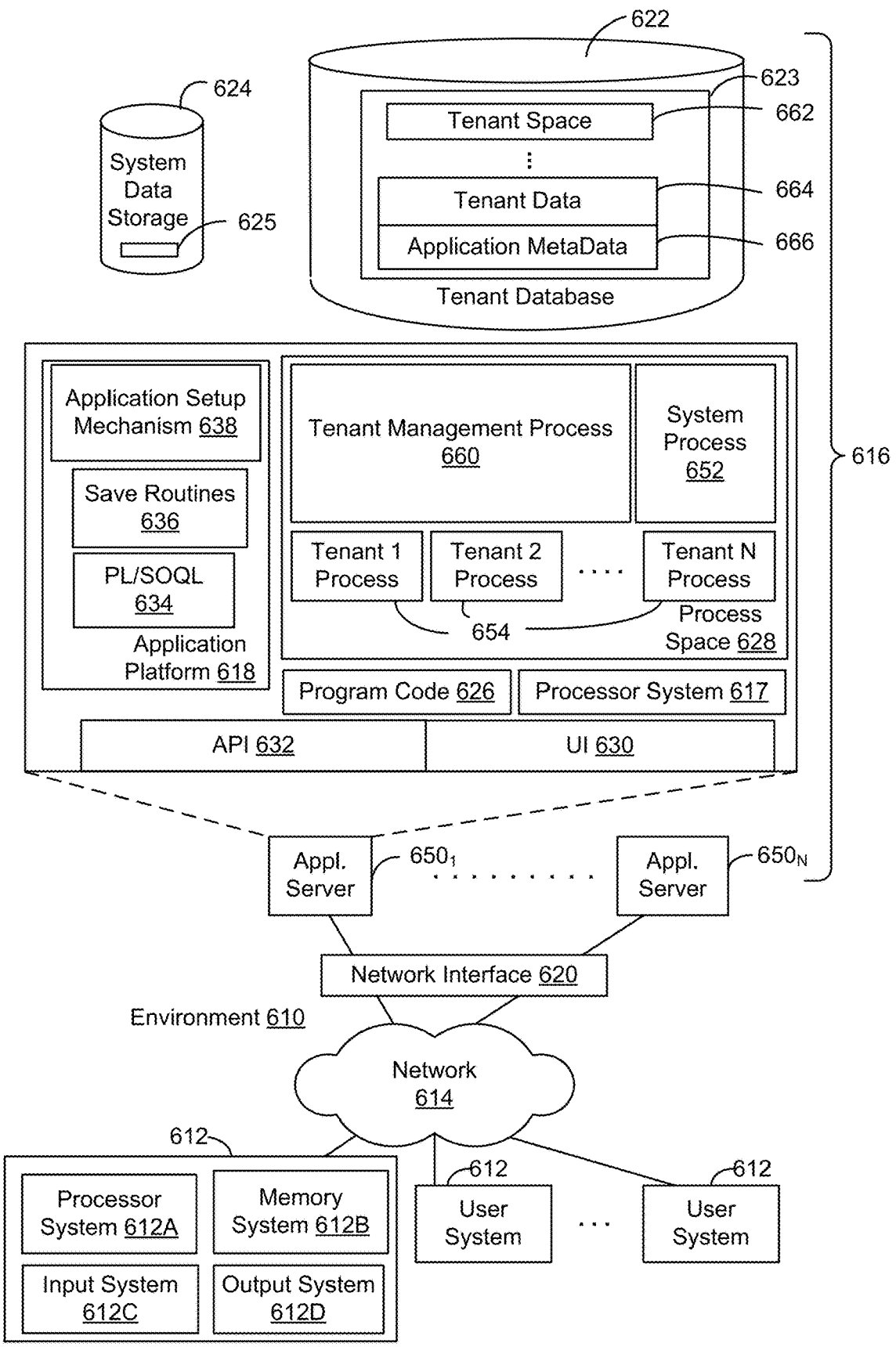
FIG. 6 shows a block diagram of an example of database environment, configured in accordance with one or more embodiments.

FIG. 6 shows a block diagram of an example of an environment 610 that includes an on-demand database service configured in accordance with some implementations. Environment 610 may include user systems 612, network 614, database system 616, processor system 617, application platform 618, network interface 620, tenant data storage 622, tenant data 623, system data storage 624, system data 625, program code 626, process space 628, User Interface (UI) 630, Application Program Interface (API) 632, PL/SOQL 634, save routines 636, application setup mechanism 638, application servers 650-1 through 650-N, system process space 652, tenant process spaces 654, tenant management process space 660, tenant storage space 662, user storage 664, and application metadata 666. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 616, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 618 may be a framework that allows the creation, management, and execution of applications in system 616. Such applications may be developed by the database service provider or by users or third-party application developers accessing the service. Application platform 618 includes an application setup mechanism 638 that supports application developers' creation and management of applications, which may be saved as metadata into tenant data storage 622 by save routines 636 for execution by subscribers as one or more tenant process spaces 654 managed by tenant management process 660 for example. Invocations to such applications may be coded using PL/SOQL 634 that provides a programming language style interface extension to API 632. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 666 for a subscriber making such an invocation. Such system processes may also manage execution of application metadata 666 as an application in a virtual machine.

In some implementations, each application server 650 may handle requests for any user associated with any organization. A load balancing function (e.g., an F5 Big-IP load balancer) may distribute requests to the application servers 650 based on an algorithm such as least-connections, round robin, observed response time, etc. Each application server 650 may be configured to communicate with tenant data storage 622 and the tenant data 623 therein, and system data storage 624 and the system data 625 therein to serve requests of user systems 612. The tenant data 623 may be divided into individual tenant storage spaces 662, which can be either a physical arrangement and/or a logical arrangement of data. Within each tenant storage space 662, user storage 664 and application metadata 666 may be similarly allocated for each user. For example, a copy of a user's most recently used (MRU) items might be stored to user storage 664. Similarly, a copy of MRU items for an entire tenant organization may be stored to tenant storage space 662. A UI 630 provides a user interface and an API 632 provides an application programming interface to system 616 resident processes to users and/or developers at user systems 612.

System 616 may implement a web-based processing engine system. For example, in some implementations, system 616 may include application servers configured to implement and execute processing engine software applications. The application servers may be configured to provide related data, code, forms, web pages and other information to and from user systems 612. Additionally, the application servers may be configured to store information to, and retrieve information from, a database system. Such information may include related data, objects, and/or Webpage content. With a multi-tenant system, data for multiple tenants may be stored in the same physical database object in tenant data storage 622, however, tenant data may be arranged in the storage medium(s) of tenant data storage 622 so that data of one tenant is kept logically separate from that of other tenants. In such a scheme, one tenant may not access another tenant's data, unless such data is expressly shared.

Several elements in the system shown in FIG. 6 include conventional, well-known elements that are explained only briefly here. For example, user system 612 may include processor system 612A, memory system 612B, input system 612C, and output system 612D. A user system 612 may be implemented as any computing device(s) or other data processing apparatus such as a mobile phone, laptop computer, tablet, desktop computer, or network of computing devices. User system 612 may run an internet browser allowing a user (e.g., a subscriber of an MTS) of user system 612 to access, process and view information, pages and applications available from system 616 over network 614. Network 614 may be any network or combination of networks of devices that communicate with one another, such as any one or any combination of a LAN (local area network), WAN (wide area network), wireless network, or other appropriate configuration.

The users of user systems 612 may differ in their respective capacities, and the capacity of a particular user system 612 to access information may be determined at least in part by "permissions" of the particular user system 612. As discussed herein, permissions generally govern access to computing resources such as data objects, components, and other entities of a computing system, such as a processing engine, a social networking system, and/or a CRM database system. "Permission sets" generally refer to groups of permissions that may be assigned to users of such a computing environment. For instance, the assignments of users and permission sets may be stored in one or more databases of System 616. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 616 may provide on-demand database service to user systems 612 using an MTS arrangement. By way of example, one tenant organization may be a company that employs a sales force where each salesperson uses system 616 to manage their sales process. Thus, a user in such an organization may maintain contact data, leads data, customer follow-up data, performance data, goals and progress data, etc., all applicable to that user's personal sales process (e.g., in tenant data storage 622). In this arrangement, a user may manage his or her sales efforts and cycles from a variety of devices, since relevant data and applications to interact with (e.g., access, view, modify, report, transmit, calculate, etc.) such data may be maintained and accessed by any user system 612 having network access.

When implemented in an MTS arrangement, system 616 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 616 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 616 may also maintain system-level data usable by multiple tenants or other data. Such system-level data may include industry reports, news, postings, and the like that are sharable between tenant organizations.

In some implementations, user systems 612 may be client systems communicating with application servers 650 to request and update system-level and tenant-level data from system 616. By way of example, user systems 612 may send one or more queries requesting data of a database maintained in tenant data storage 622 and/or system data storage 624. An application server 650 of system 616 may automatically generate one or more SQL statements (e.g., one or more SQL queries) that are designed to access the requested data. System data storage 624 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale process, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 7A:
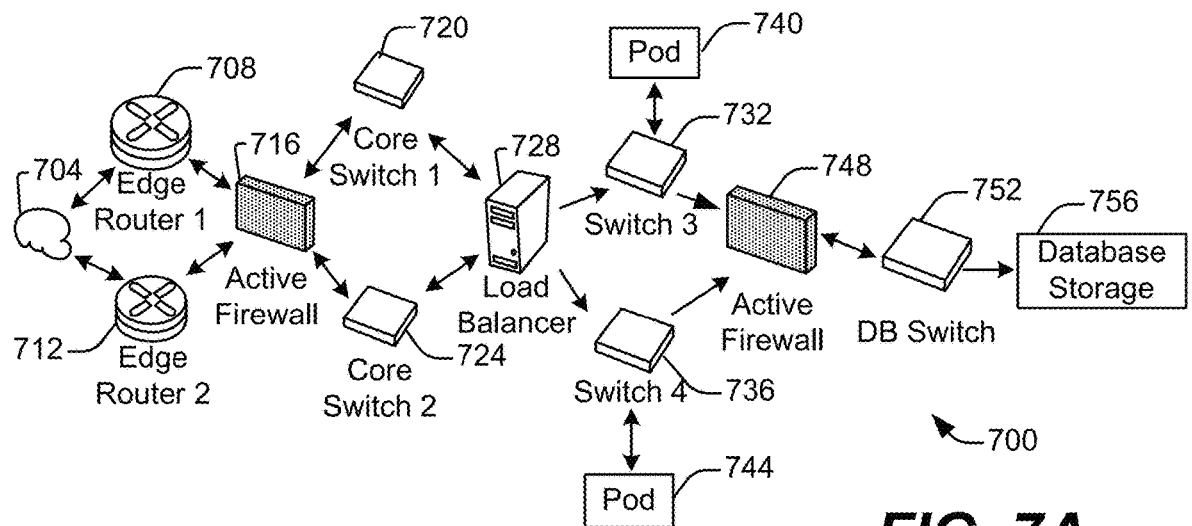
FIG. 7A shows a system diagram of an example of architectural components of an on-demand database service environment, in accordance with embodiments.

FIG. 7A shows a system diagram of an example of architectural components of an on-demand database service environment 700, configured in accordance with some implementations. A client machine located in the cloud 704 may communicate with the on-demand database service environment via one or more edge routers 708 and 712. A client machine may include any of the examples of user systems 612 described above. The edge routers 708 and 712 may communicate with one or more core switches 720 and 724 via firewall 716. The core switches may communicate with a load balancer 728, which may distribute server load over different pods, such as the pods 740 and 744 by communication via pod switches 732 and 736. The pods 740 and 744, which may each include one or more servers and/or other computing resources, may perform data processing and other operations used to provide on-demand services. Components of the environment may communicate with a database storage 756 via a database firewall 748 and a database switch 752.

Accessing an on-demand database service environment may involve communications transmitted among a variety of different components. The environment 700 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 7A and 7B.

The cloud 704 refers to any suitable data network or combination of data networks, which may include the Internet. Client machines located in the cloud 704 may communicate with the on-demand database service environment 700 to access services provided by the on-demand database service environment 700. By way of example, client machines may access the on-demand database service environment 700 to retrieve, store, edit, and/or process processing engine information.

In some implementations, the edge routers 708 and 712 route packets between the cloud 704 and other components of the on-demand database service environment 700. The edge routers 708 and 712 may employ the Border Gateway Protocol (BGP). The edge routers 708 and 712 may maintain a table of IP networks or 'prefixes', which designate network reachability among autonomous systems on the internet.

In one or more implementations, the firewall 716 may protect the inner components of the environment 700 from internet traffic. The firewall 716 may block, permit, or deny access to the inner components of the on-demand database service environment 700 based upon a set of rules and/or other criteria. The firewall 716 may act as one or more of a packet filter, an application gateway, a stateful filter, a proxy server, or any other type of firewall.

In some implementations, the core switches 720 and 724 may be high-capacity switches that transfer packets within the environment 700. The core switches 720 and 724 may be configured as network bridges that quickly route data between different components within the on-demand database service environment. The use of two or more core switches 720 and 724 may provide redundancy and/or reduced latency.

In some implementations, communication between the pods 740 and 744 may be conducted via the pod switches 732 and 736. The pod switches 732 and 736 may facilitate communication between the pods 740 and 744 and client machines, for example via core switches 720 and 724. Also or alternatively, the pod switches 732 and 736 may facilitate communication between the pods 740 and 744 and the database storage 756. The load balancer 728 may distribute workload between the pods, which may assist in improving the use of resources, increasing throughput, reducing response times, and/or reducing overhead. The load balancer 728 may include multilayer switches to analyze and forward traffic.

In some implementations, access to the database storage 756 may be guarded by a database firewall 748, which may act as a computer application firewall operating at the database application layer of a protocol stack. The database firewall 748 may protect the database storage 756 from application attacks such as structure query language (SQL) injection, database rootkits, and unauthorized information disclosure. The database firewall 748 may include a host using one or more forms of reverse proxy services to proxy traffic before passing it to a gateway router and/or may inspect the contents of database traffic and block certain content or database requests. The database firewall 748 may work on the SQL application level atop the TCP/IP stack, managing applications' connection to the database or SQL management interfaces as well as intercepting and enforcing packets traveling to or from a database network or application interface.

In some implementations, the database storage 756 may be an on-demand database system shared by many different organizations. The on-demand database service may employ a single-tenant approach, a multi-tenant approach, a virtualized approach, or any other type of database approach. Communication with the database storage 756 may be conducted via the database switch 752. The database storage 756 may include various software components for handling database queries. Accordingly, the database switch 752 may direct database queries transmitted by other components of the environment (e.g., the pods 740 and 744) to the correct components within the database storage 756.

Figure 7B:
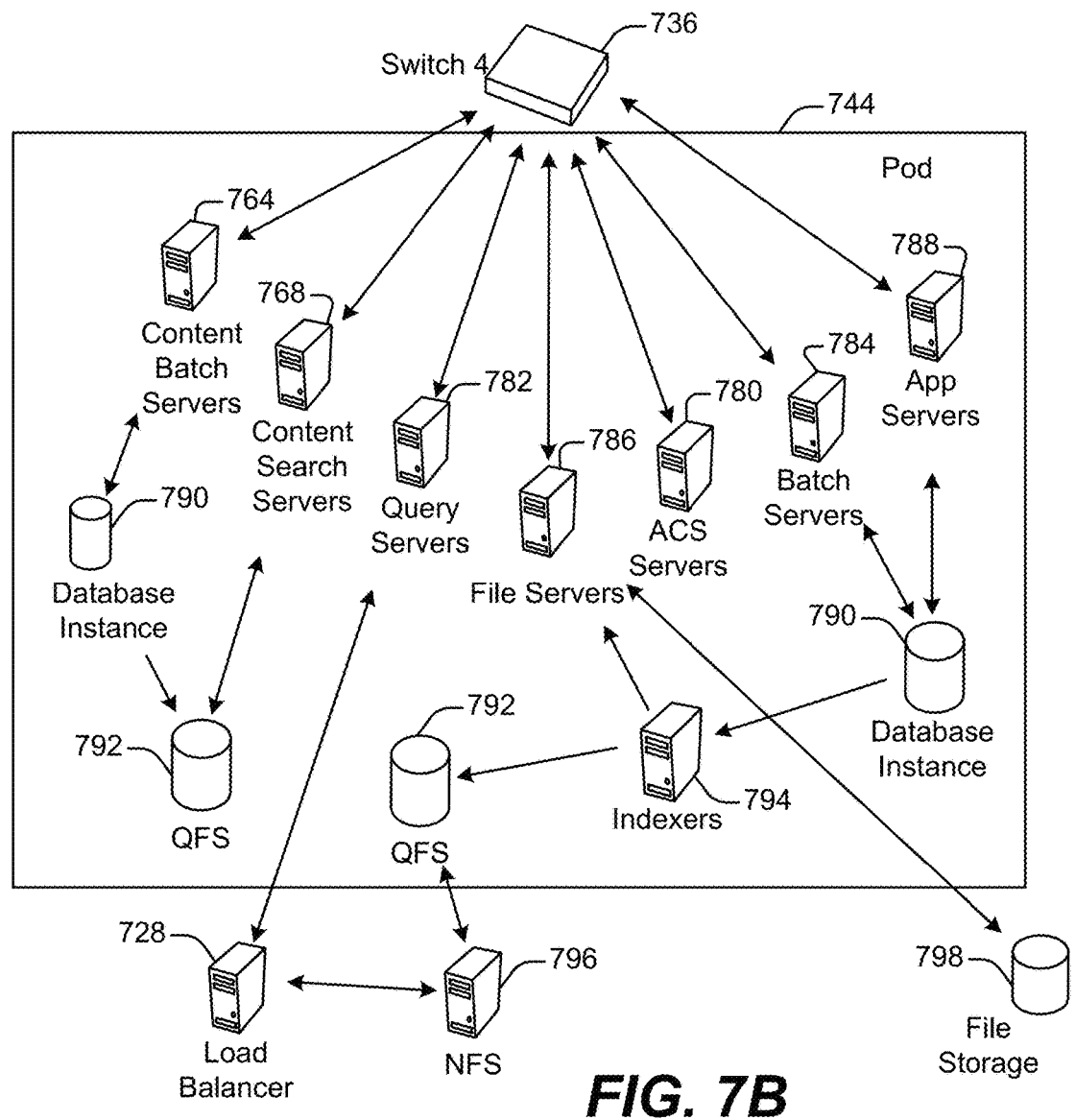
FIG. 7B shows a system diagram further illustrating an example of architectural components of an on-demand database service environment, in accordance with one or more embodiments.

FIG. 7B shows a system diagram further illustrating an example of architectural components of an on-demand database service environment, in accordance with some implementations. The pod 744 may be used to render services to user(s) of the on-demand database service environment 700. The pod 744 may include one or more content batch servers 764, content search servers 768, query servers 782, file servers 786, access control system (ACS) servers 780, batch servers 784, and app servers 788. Also, the pod 744 may include database instances 790, quick file systems (QFS) 792, and indexers 794. Some or all communication between the servers in the pod 744 may be transmitted via the switch 736.

In some implementations, the app servers 788 may include a framework dedicated to the execution of procedures (e.g., programs, routines, scripts) for supporting the construction of applications provided by the on-demand database service environment 700 via the pod 744. One or more instances of the app server 788 may be configured to execute all or a portion of the operations of the services described herein.

In some implementations, as discussed above, the pod 744 may include one or more database instances 790. A database instance 790 may be configured as an MTS in which different organizations share access to the same database, using the techniques described above. Database information may be transmitted to the indexer 794, which may provide an index of information available in the database 790 to file servers 786. The QFS 792 or other suitable filesystem may serve as a rapid-access file system for storing and accessing information available within the pod 744. The QFS 792 may support volume management capabilities, allowing many disks to be grouped together into a file system. The QFS 792 may communicate with the database instances 790, content search servers 768 and/or indexers 794 to identify, retrieve, move, and/or update data stored in the network file systems (NFS) 796 and/or other storage systems.

In some implementations, one or more query servers 782 may communicate with the NFS 796 to retrieve and/or update information stored outside of the pod 744. The NFS 796 may allow servers located in the pod 744 to access information over a network in a manner similar to how local storage is accessed. Queries from the query servers 722 may be transmitted to the NFS 796 via the load balancer 728, which may distribute resource requests over various resources available in the on-demand database service environment 700. The NFS 796 may also communicate with the QFS 792 to update the information stored on the NFS 796 and/or to provide information to the QFS 792 for use by servers located within the pod 744.

In some implementations, the content batch servers 764 may handle requests internal to the pod 744. These requests may be long-running and/or not tied to a particular customer, such as requests related to log mining, cleanup work, and maintenance tasks. The content search servers 768 may provide query and indexer functions such as functions allowing users to search through content stored in the on-demand database service environment 700. The file servers 786 may manage requests for information stored in the file storage 798, which may store information such as documents, images, basic large objects (BLOBs), etc. The query servers 782 may be used to retrieve information from one or more file systems. For example, the query system 782 may receive requests for information from the app servers 788 and then transmit information queries to the NFS 796 located outside the pod 744. The ACS servers 780 may control access to data, hardware resources, or software resources called upon to render services provided by the pod 744. The batch servers 784 may process batch jobs, which are used to run tasks at specified times. Thus, the batch servers 784 may transmit instructions to other servers, such as the app servers 788, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 8:
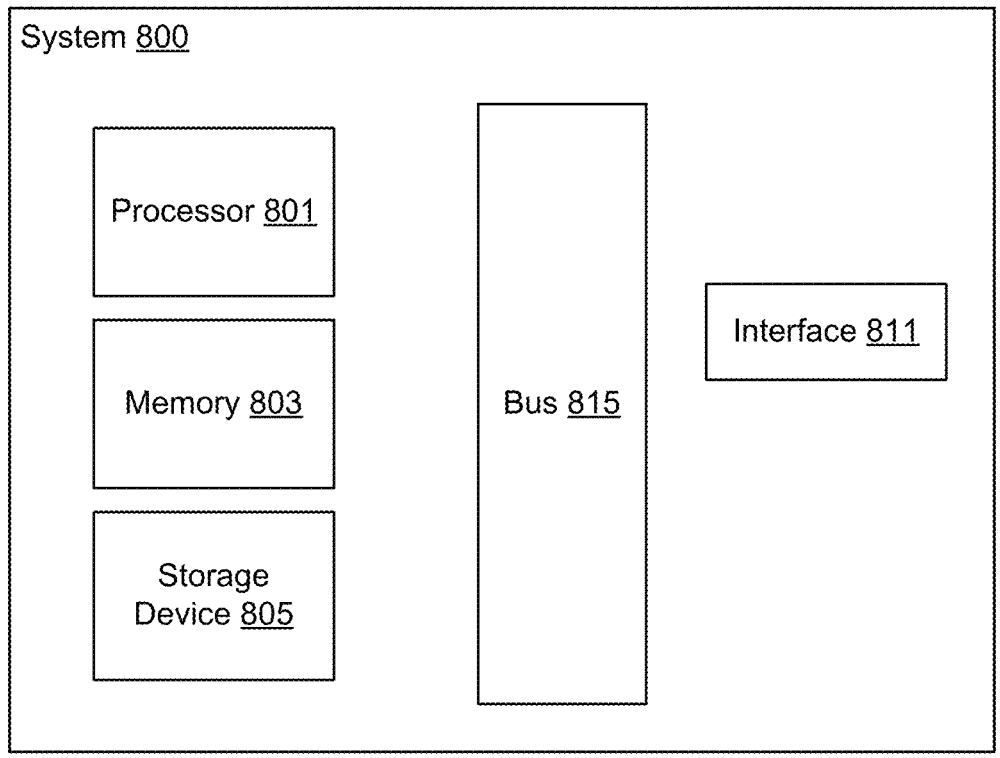
FIG. 8 illustrates one example of a computing device, configured in accordance with one or more embodiments.

FIG. 8 illustrates one example of a computing device. According to various embodiments, a system 800 suitable for implementing embodiments described herein includes a processor 801, a memory module 803, a storage device 805, an interface 811, and a bus 815 (e.g., a PCI bus or other interconnection fabric.) System 800 may operate as variety of devices such as an application server, a database server, or any other device or service described herein. Although a particular configuration is described, a variety of alternative configurations are possible. The processor 801 may perform operations such as those described herein. Instructions for performing such operations may be embodied in the memory 803, on one or more non-transitory computer readable media, or on some other storage device. Various specially configured devices can also be used in place of or in addition to the processor 801. The interface 811 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

What is claimed is:

1. A method, comprising:
   receiving a block request, the block request including one or more network addresses;
   storing the one or more network addresses in a block list at a database repository, the block list comprising a data structure with advanced schema, the advanced schema configurable to allow for downstream processing of the block list across a plurality of substrates to block incoming traffic from or outgoing traffic to the one or more network addresses at a plurality of accounts across the plurality of substrates, wherein each substrate in the plurality of substrates includes a substrate specific controller to deploy blocking to accounts in the substrate; and
   deploying the block list as one or more messages to the plurality of substrates, the plurality of substrates including a first substrate and a second substrate, the first substrate comprising a cloud infrastructure, the second substrate comprising a physical data center.

2. The method of claim 1, wherein the advanced schema is further configurable to specify inward or outward blocking, as well as global or localized blocking.

3. The method of claim 1, wherein each substrate specific controller auto-segregates accounts into multiple zones and self-replicates to handle new accounts that are added to the corresponding substrate.

4. The method of claim 1, wherein each substrate specific controller is configurable to instantiate a blocking module instance for each message in the one or more messages.

5. The method of claim 4, wherein each blocking module instance is configurable to execute parallel threads corresponding to a subset of the plurality of accounts.

6. The method of claim 1, wherein each account of the plurality of accounts is injected with an agent, the agent being configurable to self-block the account from the one or more network addresses if a heartbeat signal is not detected from the corresponding substrate specific controller.

7. A database system implemented using a server system comprising memory and one or more processors, the database system configurable to cause:
   receiving a block request, the block request including one or more network addresses;
   storing the one or more network addresses in a block list at a database repository, the block list comprising a data structure with advanced schema, the advanced schema configurable to allow for downstream processing of the block list across a plurality of substrates to block incoming traffic from or outgoing traffic to the one or more network addresses at a plurality of accounts across the plurality of substrates, wherein each substrate in the plurality of substrates includes a substrate specific controller to deploy blocking to accounts in the substrate; and
   deploying the block list as one or more messages to the plurality of substrates, the plurality of substrates including a first substrate and a second substrate, the first substrate comprising a cloud infrastructure, the second substrate comprising a physical data center.

8. The database system of claim 7, wherein the advanced schema is further configurable to specify inward or outward blocking, as well as global or localized blocking.

9. The database system of claim 7, wherein each substrate specific controller auto-segregates accounts into multiple zones and self-replicates to handle new accounts that are added to the corresponding substrate.

10. The database system of claim 7, wherein each substrate specific controller is configurable to instantiate a blocking module instance for each message in the one or more messages.

11. The database system of claim 10, wherein each blocking module instance is configurable to execute parallel threads corresponding to a subset of the plurality of accounts.

12. The database system of claim 7, wherein each account of the plurality of accounts is injected with an agent, the agent being configurable to self-block the account from the one or more network addresses if a heartbeat signal is not detected from the corresponding substrate specific controller.

13. A computer program product comprising computer-readable program code capable of being executed by one or more processors when retrieved from a non-transitory computer-readable medium, the program code comprising instructions configurable to cause:
   receiving a block request, the block request including one or more network addresses;
   storing the one or more network addresses in a block list at a database repository, the block list comprising a data structure with advanced schema, the advanced schema configurable to allow for downstream processing of the block list across a plurality of substrates to block incoming traffic from or outgoing traffic to the one or more network addresses at a plurality of accounts across the plurality of substrates, wherein each substrate in the plurality of substrates includes a substrate specific controller to deploy blocking to accounts in the substrate; and
   deploying the block list as one or more messages to the plurality of substrates, the plurality of substrates including a first substrate and a second substrate, the first substrate comprising a cloud infrastructure, the second substrate comprising a physical data center.

14. The computer program product of claim 13, wherein the advanced schema is further configurable to specify inward or outward blocking, as well as global or localized blocking.

15. The computer program product of claim 13, wherein each substrate specific controller auto-segregates accounts into multiple zones and self-replicates to handle new accounts that are added to the corresponding substrate.

16. The computer program product of claim 13, wherein each substrate specific controller is configurable to instantiate a blocking module instance for each message in the one or more messages.

17. The computer program product of claim 16, wherein each blocking module instance is configurable to execute parallel threads corresponding to a subset of the plurality of accounts.

\* \* \* \* \*